(12) United States Patent
Hutchinson et al.

(10) Patent No.: US 7,399,924 B2
(45) Date of Patent: Jul. 15, 2008

(54) SUBMERSIBLE DEVICE SEALING SYSTEM AND METHOD

(75) Inventors: Andrew Hutchinson, Williamsburg, VA (US); Michael Ritchie, Hampton, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/562,017

(22) Filed: Nov. 21, 2006

(65) Prior Publication Data

US 2008/0115970 A1    May 22, 2008

(51) Int. Cl.
*H01R 9/05* (2006.01)
(52) U.S. Cl. .................................... 174/74 R
(58) Field of Classification Search ............... 174/74 R, 174/76, 77 R, DIG. 8
See application file for complete search history.

(56) References Cited

U.S. PATENT DOCUMENTS 4,599,487 A * 7/1986 Blank et al. ................. 174/151
4,626,721 A * 12/1986 Ouchi ......................... 310/71
2006/0148311 A1   7/2006 Jurgen et al.

FOREIGN PATENT DOCUMENTS

| EP | 0351982 A | 1/1990 |
|---|---|---|
| WO | WO96/05584 A | 2/1996 |
| WO | WO01/29932 A | 4/2001 |

* cited by examiner

*Primary Examiner*—Chau N Nguyen
(74) *Attorney, Agent, or Firm*—GE Global Patent Operation

(57) ABSTRACT

A submersible device sealing system includes a submersible device, a cable having wires connected to the submersible device, and a sheath about the wires. There is a sleeve about the cable sheath, and a crimp about the sleeve. An encapsulant is disposed about the crimp, the wires, and the submersible device to prevent fluid ingress to the wires connected to the submersible device. The encapsulant is made of material separable from the cable sheath but the crimp is made of a material bondable to the encapsulant to seal the submersible device with respect to the fluid.

10 Claims, 3 Drawing Sheets

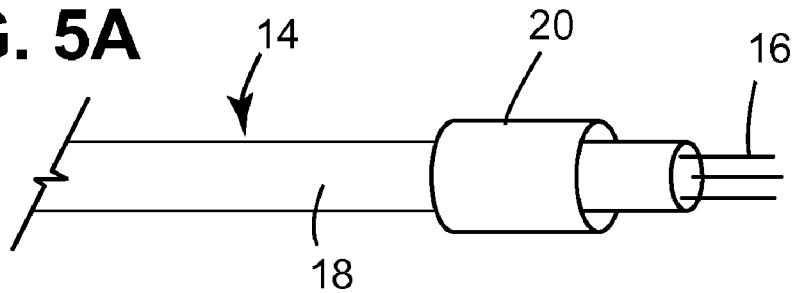
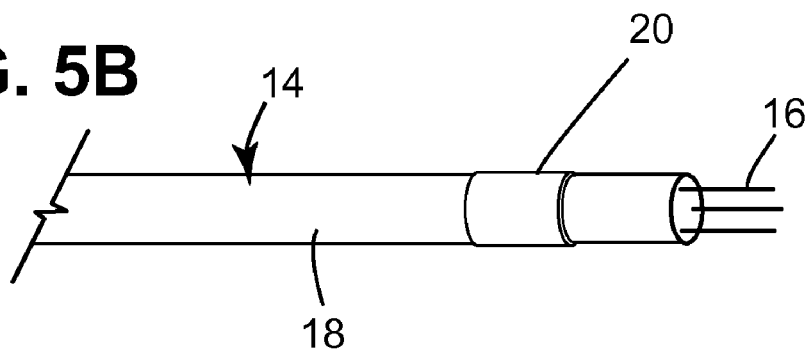
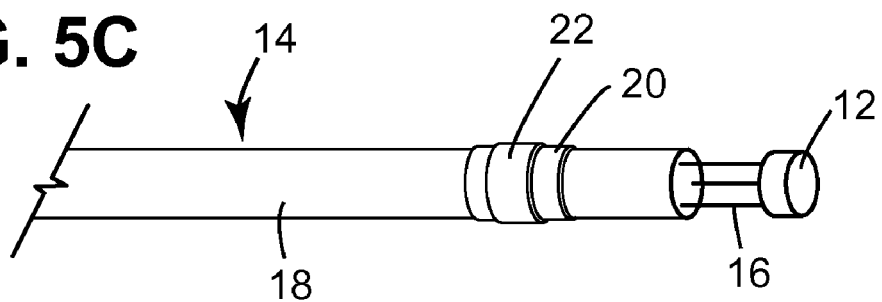
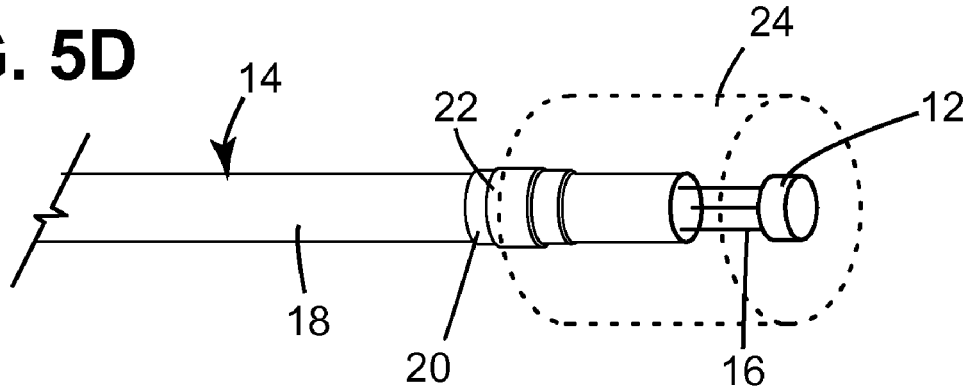

SUBMERSIBLE DEVICE SEALING SYSTEM AND METHOD

FIELD OF THE INVENTION

This subject invention relates to submersible devices including submersible sensors.

BACKGROUND OF THE INVENTION

Various types of devices are submerged in fluids for many purposes. For example, sensors are utilized in assorted industries to sense pressure, temperature, or other parameters. The electrodes of a sensor module are typically connected to wires in a cable. Submersible sensors may be submerged in a fluid which is typically not compatible with either the sensor module or the wires. Gasoline, water and diesel fuel are examples. To prevent sensor damage, the sensor module and wires must be sealed, typically at the cable entry point, in order to prevent the ingress of damaging liquids which can destroy the sensor or reduce its effectiveness. The cable sheath must be able to withstand exposure to the fluid.

One way to provide the seal is with an encapsulant about the exposed wires and electrodes. A TEFLON® sheath about the cable protects the wires. But, such materials do not bond well to the encapsulant. Over time, ingress of the surrounding fluid can contaminate and damage the sensor module and/or wiring.

Those skilled in the art have attempted to improve adhesion between the cable and the encapsulant by priming and/or etching the TEFLON® cable sheath. Such efforts result in a more costly sensor which is sometimes still unreliable when submerged.

SUMMARY OF THE INVENTION

Embodiments of this invention provide a cost-effective, less complex, more robust and reliable submersible device sealing system and method capable of sealing out fluids which, if allowed to penetrate the device and/or associated wiring, could cause damage, reduce performance, or render the device and system ineffective.

In the various embodiments of this invention, the applicants' submersible device sealing system includes a crimp over a sleeve about a cable, typically in the area near the submersible device. In one aspect, the crimp material, for example metal, is such that it provides improved adherence with typical encapsulants, thus providing an improved seal between the system cable and the encapsulant.

The invention embodiments, however, need not achieve all these objectives and results and the claims hereof should not be limited to structures or methods capable of achieving these objectives and results.

This invention features a submersible device sealing system including a submersible device, a cable having wires connected to the submersible device, and a sheath about the wires. A sleeve is placed about the cable sheath and a crimp is disposed about the sleeve. An encapsulant is deposited or disposed about the crimp, the wires, and the submersible device to prevent fluid ingress to the wires connected to the submersible device. The encapsulant is made of material separable from the cable sheath, but the crimp is made of material bondable to the encapsulant to seal the submersible device with respect to the fluid. The system may further include a housing about the submersible device, the encapsulant, and the crimp. In one embodiment, the sleeve is made of compliant material, and the compliant material may be heat shrinkable material, or the compliant material may be rubber, polytetrafluoroethylene, fluoroelastomer, polychloroprene or polyolefin. In one example, the sleeve surrounds the cable sheath, and the crimp is a tube surrounding the sleeve. The crimp may be made of metal, and some examples of suitable materials for the crimp include stainless steel, titanium, brass, or corrosion resistant metal alloy. In one variation, the crimp may be made of plastic. The encapsulant may be an epoxy. In one embodiment, the submersible device includes a sensor module.

This invention also features a submersible device sealing system including a submersible device, a cable having wires connected to the submersible device, and a compliant sheath about the wires. A tubular metal crimp surrounds the compliant cable sheath, and an encapsulant is disposed about the crimp, the wires, and the submersible device to prevent fluid ingress to the wires connected to the submersible device. The compliant cable sheath may be made of material selected from the group consisting of rubber, polytetrafluoroethylene, fluoroelastomer, polychloroprene and polyolefin. The system may further include a housing about the submersible device, the epoxy, and the crimp. In one embodiment the submersible device includes a sensor module.

This invention further features a submersible device sealing system including a submersible device, a cable connected to the submersible device, a sleeve about the cable, a crimp about the sleeve, and an encapsulant about the crimp, the cable, and the submersible device to prevent fluid ingress to the submersible device. In one embodiment, the sleeve is made of compliant material which surrounds the cable, and the crimp is a stainless steel tube which surrounds the sleeve. In one example, the encapsulant is made of material separable from the cable, but the crimp is made of material bondable to the encapsulant to seal the submersible device with respect to the fluid. In one variation the submersible device includes a sensor module.

This invention also features a method for sealing a submersible device, the method including connecting a submersible device to a cable having wires and a sheath about the wires, placing a sleeve about the cable sheath, and disposing a crimp about the sleeve for compressing the sleeve against the cable sheath. The method further includes depositing an encapsulant about the crimp, the wires, and the submersible device to prevent fluid ingress to the wires and to seal the submersible device with respect to the fluid. In one embodiment, the crimp is made of material bondable to the encapsulant. The sleeve may be made of compliant material surrounding the cable sheath, and in one example, the crimp is a metal tube surrounding the sleeve. In one variation, the method includes connecting the submersible device to the cable wires after the sleeve is placed about the cable sheath and the crimp is disposed about the sleeve. In one embodiment the submersible device includes a sensor module.

This invention further features a method for sealing a submersible device, the method including connecting a submersible device to wires of a cable having a compliant sheath about the wires, disposing a crimp about the compliant sheath and compressing the compliant cable sheath, and depositing an encapsulant about the crimp, the wires, and the submersible device to prevent fluid ingress to the wires and to seal the submersible device with respect to the fluid. In one embodiment, the crimp is made of material bondable to the encapsulant, and the crimp may be a metal tube surrounding the compliant sheath. In one variation, the submersible device includes a sensor module.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIGS. 5A-5D are highly schematic views showing how a seal is made in accordance with the subject invention.

DETAILED DESCRIPTION OF THE INVENTION

Figure 1:
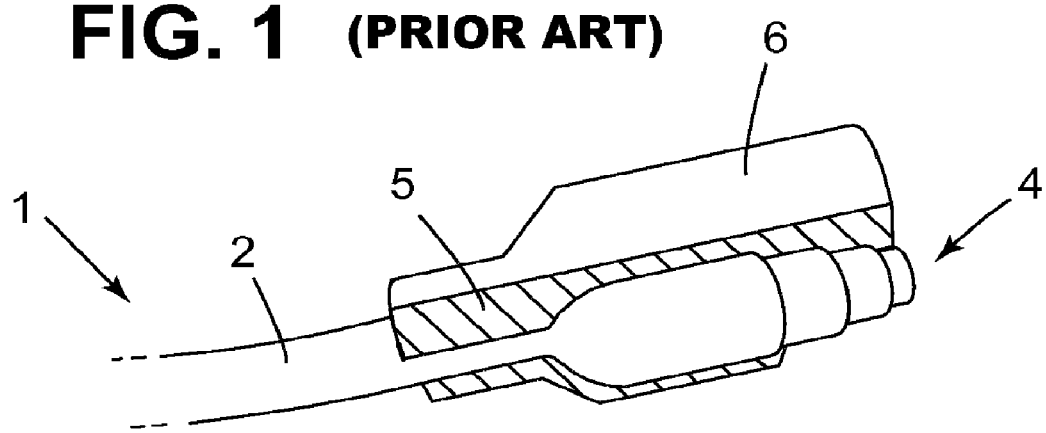
FIG. 1 is a schematic cut-away view of a typical prior art submersible sensor.

Aside from the embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
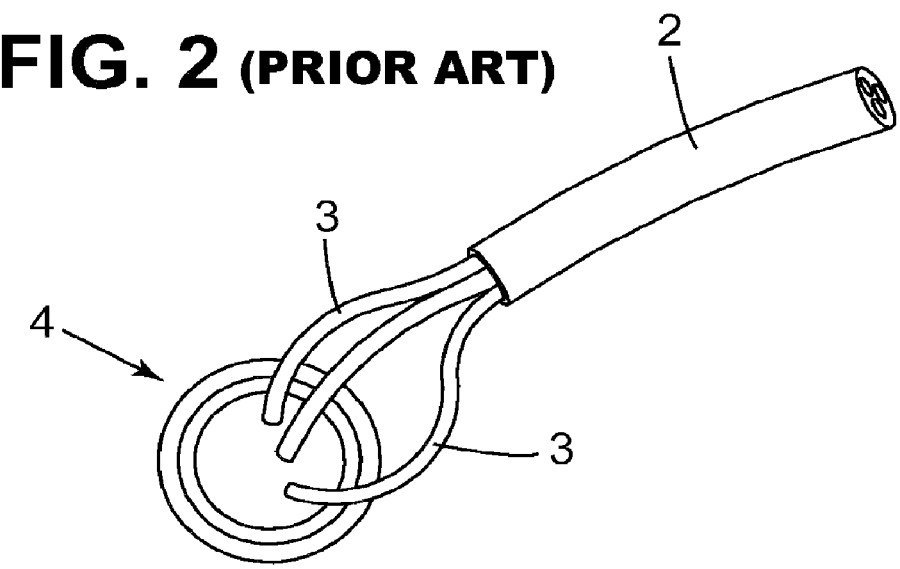
FIG. 2 is a schematic three-dimensional view showing the sensor of FIG. 1 and the cable wires attached to the sensor module electrodes before encapsulation.

As discussed in the Background section above, a typical prior art submersible device, such as a sensor, includes cable 1, FIGS. 1-2 with wires 3 connected the electrodes of sensor module 4, all surrounded by encapsulant 5. Optional housing 6 may also be provided. The goal is to prevent fluid from leaking along the cable to the sensor module or wiring. TEFLON® is often chosen for the material of cable sheath 2 because it can withstand submersion in fluids such as gasoline or diesel fuel. But these inert properties of the cable sheath material result in poor adhesion with the encapsulant, so encapsulant 5 will eventually separate from the cable sheath 2 and undesirable leakage will occur.

Figure 3:
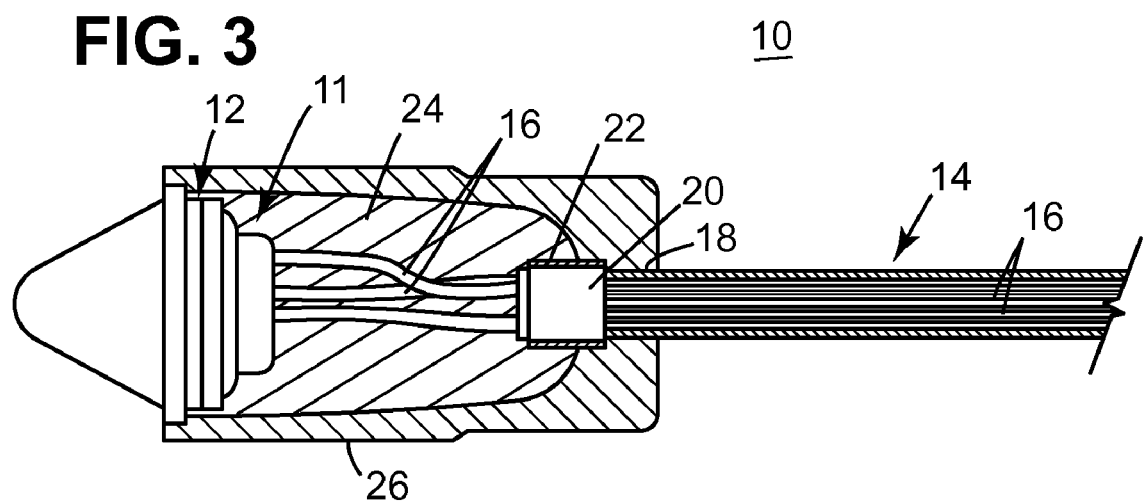
FIG. 3 is a schematic partial cross-sectional side view of an embodiment of a submersible device sealing system in accordance with the present invention.

In one aspect of the subject invention, submersible device sealing system 10, FIG. 3 includes submersible device 11 and cable 14 having wires 16. In one embodiment, submersible device 11 includes sensor module 12. Wires 16 are within cable sheath 18. Sleeve 20 is placed about cable sheath 18. Crimp 22 is then disposed about sleeve 20 compressing it against cable sheath 18, and together with sleeve 20 provides a solution to the leakage problem suffered by prior art submersible devices and systems. Sleeve 20 conforms to cable sheath 18 as well as crimp 22 so there is no leakage between crimp 22 and cable sheath 18. And, the material of crimp 22 is chosen such that it is bondable with the encapsulant used at 24 to seal wires 16 and submersible device 11 so there is no leakage between crimp 22 and the encapsulant. Although not necessary, in one embodiment housing 26 is disposed about submersible device 11, the encapsulant, and crimp 22.

In one aspect of the invention, crimp 22 is a tube surrounding sleeve 20. Encapsulant 24 is deposited or disposed about crimp 22, wires 16 and submersible device 11 to prevent fluid ingress to wires 16 connected to submersible device 11. One encapsulant suitable for use with embodiments of the subject invention is an epoxy, although various other types of encapsulants may be used depending on a particular application. Materials suitable for cable sheath 18 include known cable materials, for example, polytetrafluoroethylene (PTFE or TEFLON®), an elastomer such as thermoplastic polyester elastomer (e.g. HYTREL®), fluoroelastomer (e.g. VITON®), polychloroprene (e.g. NEOPRENE®) or ethylene-tetrafluoroethylene fluoropolymer (e.g. TEFZEL®). Cable sheath 18 typically does not adhere to encapsulant 24, resulting in poor bonding with encapsulant 24. Crimp 22, however, provides a substitute to attaching encapsulant 24 directly to cable sheath 18. Crimp 22 is made of material which is bondable with encapsulant 24 and which provides improved adherence in order to seal submersible device 11 with respect to the surrounding fluid. In this way, unwanted fluid leakage between cable sheath 18 and encapsulant 24, especially at cable entry point 19, will not occur. Accordingly, damage to wires 16 and/or submersible device 11, such as a sensor module 12, is avoided.

Figure 4:
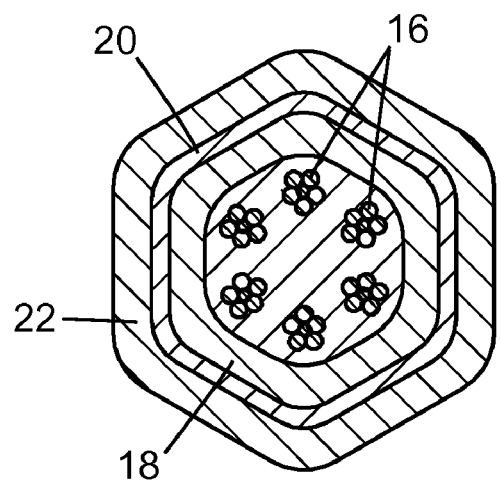
FIG. 4 is a schematic view of an embodiment of a submersible device sealing system in accordance with the present invention showing a cross-section at a point where the crimp surrounds the cable.

In various embodiments of the invention, sleeve 20 between crimp 22 and cable sheath 18 is made of compliant material to increase the effectiveness of crimp 22 and the resultant seal. Some non-limiting examples of compliant material suitable for sleeve 20 include rubber, polytetrafluoroethylene (PTFE), fluoroelastomer (e.g. VITON®), polychloroprene (e.g. NEOPRENE®), or polyolefin. Sleeve 20 may also be made of heat shrinkable material if desired for a particular application. FIG. 4 shows metal crimp 22 over heatshrunk sleeve 20 on cable sheath 18.

In one aspect of the invention sleeve 20 may be eliminated, and crimp 22 disposed directly about cable sheath 18, when for example, cable sheath 18 is itself made of compliant material, such as rubber, polytetrafluoroethylene, fluoroelastomer, polychloroprene or polyolefin, for example.

Although as noted above crimp 22 can be made of any material and finish which will bond with encapsulant 24, in one embodiment crimp 22 is made of metal, and some non-limiting examples of materials suitable for crimp 22 are stainless steel, titanium, brass, or corrosion resistant metal alloys. For some applications, crimp 22 may be made of plastic.

As shown in FIGS. 5A-5D heat shrink sleeve 20 is placed on cable sheath 18 and then shrunk as shown in FIG. 5B. Next, metal crimp 22 is clamped about sleeve 20 and cable wires 16 are connected to submersible device 11, such as a sensor module 12. Next, encapsulant 24 is deposited about crimp 22, wires 16, and submersible device 11. Compliant sleeve 20 prevents ingress of fluid under crimp 22 between it and cable sheath 18. Encapsulant 24 seals better to crimp 22 than to cable sheath 18 preventing fluid ingress between crimp 22 and encapsulant 24. As noted above, if cable sheath 18 itself is made of compliant material, the step of placing sleeve 20 on cable sheath 18 may be eliminated. In such a case, metal crimp 22 is clamped about the cable sheath directly. Thus, it is the compliant cable sheath together with crimp 22 which prevent ingress of fluid under crimp 22. Crimp 22 still provides improved adherence to encapsulant 24.

Accordingly, the various embodiments of the present invention provide a submersible device sealing system and method which prevents leakage, provides better and longer-lasting sealing, is more robust, easy to manufacture, and which preserves the life of the sensor, all at low cost.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed. Those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A submersible device sealing system comprising:
   a submersible device;
   a cable having wires connected to the submersible device and a sheath about the wires;
   a compliant sleeve about the cable sheath, the sleeve made of compliant, heat shrinkable material;
   a crimp about the sleeve; and
   an encapsulant about the crimp, the wires, and the submersible device to prevent fluid ingress to the wires connected to the submersible device,
   the encapsulant made of material separable from the cable sheath but the crimp made of material bondable to the encapsulant to seal the submersible device with respect to the fluid.

2. The system of claim 1 further including a housing about the submersible device, the encapsulant, and the crimp.

3. The system of claim 1 in which the compliant heat shrinkable material is selected from the group consisting of rubber, polytetrafluoroethylene, fluoroelastomer, polychloroprene and polyolefin.

4. The system of claim 1 in which the sleeve surrounds the cable sheath.

5. The system of claim 1 in which the crimp is a tube surrounding the sleeve.

6. The system of claim 1 in which the crimp is made of metal.

7. The system of claim 1 in which the crimp is made of material selected from the group consisting of stainless steel, titanium, brass, and corrosion resistant metal alloy.

8. The system of claim 1 in which the crimp is made of plastic.

9. The system of claim 1 in which the encapsulant is an epoxy.

10. The system of claim 1 in which the submersible device includes a sensor module.

* * * * *